United States Patent [19]

Dietzen

[11] Patent Number: 4,878,576

[45] Date of Patent: Nov. 7, 1989

[54] METHOD FOR ACCUMULATING AND CONTAINING BORE HOLE SOLIDS AND RECOVERING DRILL FLUIDS AND WASTE WATER ON DRILLING RIGS

[76] Inventor: Gary H. Dietzen, 110 Stonewood Cir., Lafayette, La. 70508

[21] Appl. No.: 250,998

[22] Filed: Sep. 27, 1988

Related U.S. Application Data

[63] Continuation of Ser. No. 99,653, Sep. 28, 1987, abandoned, which is a continuation of Ser. No. 822,009, Jan. 24, 1986, abandoned, which is a continuation-in-part of Ser. No. 783,009, Oct. 1, 1985, abandoned, which is a continuation-in-part of Ser. No. 570,398, Jan. 13, 1984, abandoned.

[51] Int. Cl.$^4$ .................. B65G 21/00; B65G 45/00; E21B 21/06
[52] U.S. Cl. ........................ 198/494; 175/66; 175/207; 198/823; 198/860.2
[58] Field of Search ............ 198/494, 498, 823, 841, 198/842, 846, 847, 860.2; 175/66, 206, 207

[56] References Cited

U.S. PATENT DOCUMENTS 2,121,650  6/1938  Berman et al. .............. 198/847
2,628,709  2/1953  Steinmetz ..................... 198/494
3,292,773  12/1966  Keehart et al. .............. 198/823
4,170,293  10/1979  Campbell ..................... 198/860.4

Primary Examiner—Andres Kashnikow
Attorney, Agent, or Firm—Pravel, Gambrell, Hewitt, Kimball & Krieger

[57] ABSTRACT

Conveyor apparatus for conveying oil well drill cuttings comprises an elongated two-level structural conveyor support that includes first and second elongated self-supporting structural sections, each section including an upper V-shaped conveyor surface, a lower flat return surface, and side walls, providing an enclosure that prevents spillage. A motor-driven drive roller is carried by one of the self-supporting structural sections while an idler roller spaced from the drive roller is carried by the second structural section. An endless conveyor belt is mounted upon and between the two spaced-apart rollers. The drive roller includes a plurality of radially spaced channels for removing slurried well cuttings, oil, drilling mud and like fluid from the contact area between the drive roller and the belt. Frictional contact between the roller and the belt is thus insured.

4 Claims, 3 Drawing Sheets

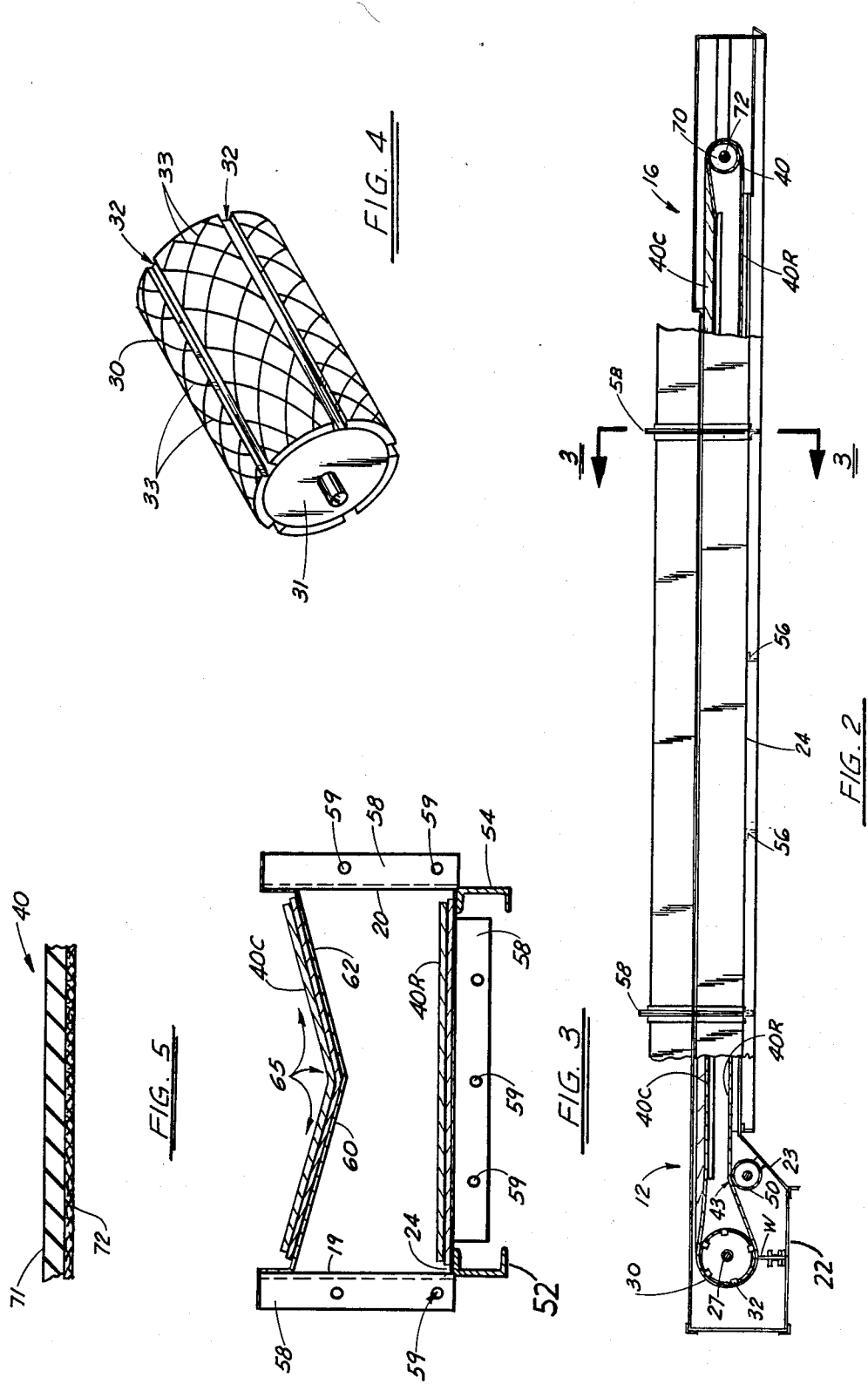

METHOD FOR ACCUMULATING AND CONTAINING BORE HOLE SOLIDS AND RECOVERING DRILL FLUIDS AND WASTE WATER ON DRILLING RIGS

This is a continuation of U.S. patent application Ser. No. 07/099,653, filed Sept. 28, 1987, and now abandoned, which is a continuation of Ser. No. 06/822,009, filed Jan. 24, 1986, and now abandoned, which is a continuation-in-part of Ser. No. 06/783,009, filed Oct. 1, 1985, and now abandoned, which is a continuation-in-part of Ser. No. 570,398, filed Jan. 13, 1984, and now abandoned.

BACKGROUND OF THE INVENTION

1. Field of the Invention

The present invention relates to oil and gas well drilling and to the disposal of bore hole cuttings and like solids, used drilling fluids and waste water on drilling rigs. The present invention more particularly relates to the collection, loading, and disposal of bore hole cuttings.

2. General Background

Washing shale cuttings extracted from oil well bore holes and returning the cleaned cuttings to the soil or water mass surrounding a drilling rig was once a widely accepted practice in the drilling industry. However, government environmental regulations have caused many oil well operators to look for alternate methods of disposing of the cuttings since it is often difficult to clean the cuttings sufficiently to meet the government standards.

Typically shale cuttings mixed with drilling fluids are extracted from oil well bore hole during drilling operations. As the cuttings and drilling fluids come out of the bore hole, they are cycled through solids separators and solids removal equipment, commonly known in this industry as shale shakers and hydroclone mud cleaners, which separates the shale cuttings from the drilling fluids. As used herein, the term solids separator refers to any of a class of machines which are used on oil well drilling rigs to separate drill cuttings from the drilling mud stream, including e.g. shale shakers, hydrocyclone mud cleaners, and the like. A trough slanted at an angle connects the solids removal equipment to a cutting water. A wash solution of water and a special soap mixture circulate through the trough. Shale cuttings separated from the drilling fluids are released from the solids removal equipment into the trough. The wash solution mixes with the shale cuttings and forms a slurried composition which is carried by gravitational forces to a cuttings washer. The cuttings washer receives the slurry, swirls it around to clean the cuttings and pumps the slurry over a high-speed shaker which separates the cuttings from the wash solution. Cleaned cuttings from the high-speed shaker are either dumped over the side of the rig into the environment or loaded into containers to be transported to a disposal site.

Washing shale cuttings or solids has a number of disadvantages, including those set forth below. First, the equipment requires constant supervision and maintenance to insure the proper cleaning of the cuttings. Second, the cleaned cuttings often do not meet government environmental regulation thus exposing oil well operators to the possibility of large fines for polluting the environment and even larger costs for cleaning water bottoms in the area of the drilling rig. Third, maintaining the proper composition of the wash solution is difficult. Frequently small amounts of oil-based liquids are discharged into the solids removal equipment along with the shale cuttings. The oil-based liquids rapidly deteriorate the wash solution. Additionally, the cuttings are often bentonic or clay-bearing in nature. These cuttings react with the wash solution reducing its efficiency. Wash solutions contaminated by oil-based liquids and bentonic cuttings must be replaced, thus increasing the costs of drilling the oil well. Fourth, expensive drilling fluids not separated from the cuttings in the solids removal equipment are dispersed into the wash solution and cannot be salvaged and reused. Fifth, the was method generates two by-products, large amounts of dirty water and sludge, which must be stored on the rig until they can be transported to a disposal site. The sludge accumulates in the bottom of the washer tanks and in the dirty water holding tanks. Its consistency is such that it is difficult to move. Since it clogs pumps and hoses it often must be shoveled into containers manually.

Some oil well operators, distrustful of the effectiveness of the wash system and concerned about the environment have chosen not to return the washed cuttings to the waters surrounding drilling rigs. They use the cuttings washer to consolidate the cuttings, which are then deposited into containers for transportation to disposal sites.

The methods of filling the containers with shale cuttings are primitive. The basic rig design with its limited space and large equipment which obstructs available space make it difficult to place large solids transport containers near the solids removal equipment and the cuttings washer. Presently, cuttings are manually shoveled into barrels and similar smaller containers which are sometimes emptied into larger containers for transportation to the disposal site. The shoveling and dumping of cuttings into large containers is not only messy, but also hazardous and labor intensive. Additionally, there are no means for recovering the drilling fluids discharged from the solids removal equipment.

An assortment of containers are now being used to transport the cuttings to the disposal site. The containers include plastic bags, barrels, metal boxes and tanks. Often the containers do not have appropriate closing means and the cuttings spill or leak during transit to the disposal site, thus obligating the oil well operator to the additional expense of cleaning the mess.

Methods for transportation material and people from location to location through the use of conveyor or moving stairways are used in various commercial establishments. Some conveyor systems and conveyor housings have been patented. Several of those patents are noted hereinafter.

U.S. Pat. No. 4,051,948 issued to Walter James Sackett, Sr. shows a dual conveyor system enclosed in a housing which protects the material to be moved from moisture and dust and prevents the material from spilling during transit.

U.S. Pat. No. 2,343,762 issued to John Jay Hankin discloses a screen type conveyor having a side guard along the edges of the conveyor which prevents material from falling off the side edges of the conveyor in transit.

U.S. Pat. No. 2,634,850 issued to Hans E. Hansen shows an apparatus which is used to clean continuously the drip pans of moving stairways.

U.S. Pat. No. 2,617,515 issued to Otto Hobnecker shows a device for cleaning the dirt and dust which accumulates on the interior of the supporting structure of a moving stairway.

U.S. Pat. No. 3,315,782 issued to Richard T. Tyndall discloses a valve for conveyor housings which facilitates cleaning th interior of the housing.

U.S. Pat. No. 4,026,603 issued to Werner Georg shows a conveyor system comprising a series of interconnectible pans arranged end to end having a scraper-chain assembly which circulates through the conveyor sections to move materials.

U.S. Pat. No. 4,170,293 issued to David R. Campell shows a housing for a conveyor having exterior structural supports.

U.S. Pat. No. 3,878,936 issued to Fred William Niggemyer teaches a conveyor housing having a bottom portion and a top portion fastened together by bolts and toggle type C-clamps.

U.S. Pat. No. 3,147,852 issued to W. Hanson, Jr. shows a conveyor cover which protects material being conveyed from the elements.

The foregoing patents show some features of conveyors and conveyor housings used in the transportation of people and materials from location to location. These devices however fail to disclose the method and apparatus of the present invention which solves the problem of well cuttings disposal in a simple, straightforward and easy manner.

GENERAL DISCUSSION OF THE PRESENT INVENTION

The preferred embodiment of the present invention is a method for accumulating and containing bore hole cuttings and recovering used drilling fluids and waste water on drilling rigs. The method features at least one solids collection unit which accumulates the cuttings and transfers them to a solids collection and disposal site on the rig. A sealable container at the collection site receives the cuttings and holds them during transit to a disposal site. A liquids collection and extraction unit can collect, separate, and recycle the drilling fluids and waste water.

In the preferred embodiment of the present invention, the solids collection and conveyor system comprises a series of interconnected conveyor sections. The conveyor belt in the preferred embodiment is contained in a sealed, self supporting structural section that has vertical sides connected to the edges of the outer surfaces of a bottom which supports the return run in the belt. The sealed sections retain solids or liquids discharged from the solids removal equipment on the surface of the conveyor belt during transit to the solids collection site. Each conveyor section has a housing having a bottom portion over which is stretched the conveyor belt return run. In the preferred embodiment, the sections have a V-shaped conveyor bed extending from the two vertical sides and spaced above the bottom and return run of the belt for supporting the upper conveying section of the belt. The bottom portion of the housing in combination with the side walls functions as a catchbasin capturing spills and leaks from the conveyor belt.

The conveyor sections are positioned during operation adjacent the solids separators to receive discharged solids and liquids onto the surface of the conveyor belt. Gravity flow alone effects a transfer of solids from the solids separators to the conveyor system. To facilitate the discharge of those materials, the drive section or tail section of these conveyor sections can have an open top so that discharged solid material, cuttings and the like fall from the guide to the conveyor.

The conveyor sections upon assembly can have spaced apart solids removal equipment with enclosing top portions. These top portions in the preferred embodiment are generally flat and are fastened to the bottom portion of the housing by, for example, bolted connections. However, at transverse intersections of conveyor sections, the top portion of the housing can be enlarged to cover the points of intersection. The top portions of the housing allow the conveyor belt and its contents to be completely enclosed and protected from the weather.

There are various advantages of the use of the solids collection unit and solids transport containers in the preferred embodiment of the present invention. First, the present method eliminates the necessity for a water and soap solution as a medium for transporting shale cuttings. Thus, the present method eliminates the accumulation of large amounts of waste water on the drilling rig and the costs of purchasing the soap concentrates.

Second, errant drilling fluids discharged from the solids removal equipment along with the cuttings or solids may be collected and reused, thus reducing the necessity for obtaining additional drilling fluids.

Third, the present method of shoveling shale and the messy spills and manual labor associated therewith are minimized.

It is among the objects of the present invention to provide an improved method of collecting, containing and transporting for disposal, shale cuttings extracted from oil well bore holes which is compatible with existing solid separator equipment.

It is another object to provide a portable conveyor system for collecting, containing and transporting shale cuttings.

It is another object to provide oil well operators with an improved method for complying with government environmental regulations concerning the disposal of shale cuttings and waste water.

Still further and other objects will be evident from the description and drawings.

BRIEF DESCRIPTION OF THE DRAWINGS

A better understanding of the invention can be had when the detailed description of a preferred embodiment set forth below is considered in conjunction with the drawings, in which:

FIG. 2 is a side, partially broken away view of the preferred embodiment of the apparatus of the present invention;

FIG. 3 is a sectional view of the preferred embodiment of the apparatus of the present invention with the cover removed;

FIG. 4 is a fragmentary view illustrating the drive roller portion of the preferred embodiment of the apparatus of the present invention;

FIG. 5 is a partial, sectional illustrating the belt used with the preferred embodiment of the apparatus of the present invention.

DETAILED DESCRIPTION OF THE PREFERRED EMBODIMENT

Figure 1:
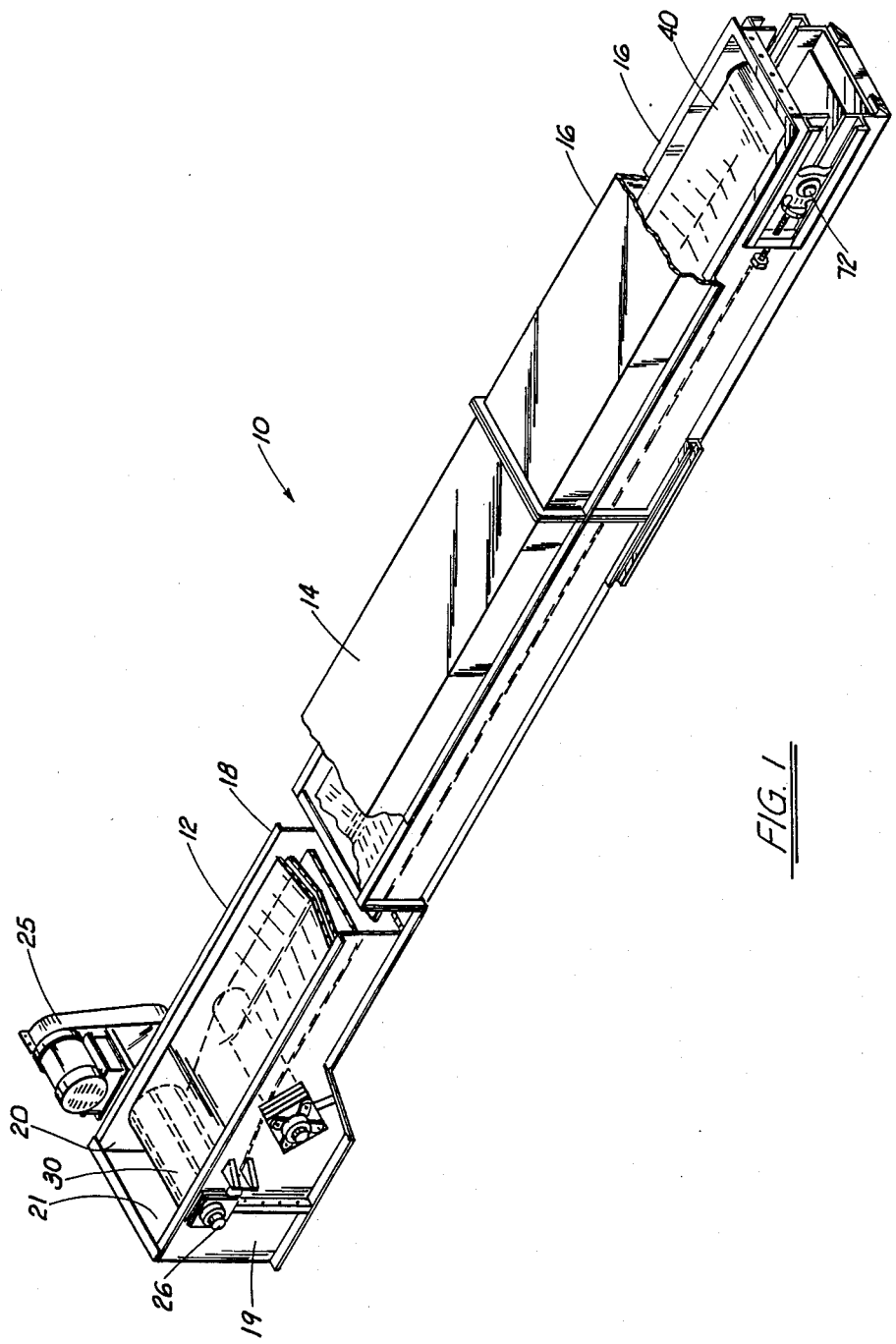
FIG. 1 is a perspective, partially broken away view of the preferred embodiment of the apparatus of the present invention.
Figure 6:
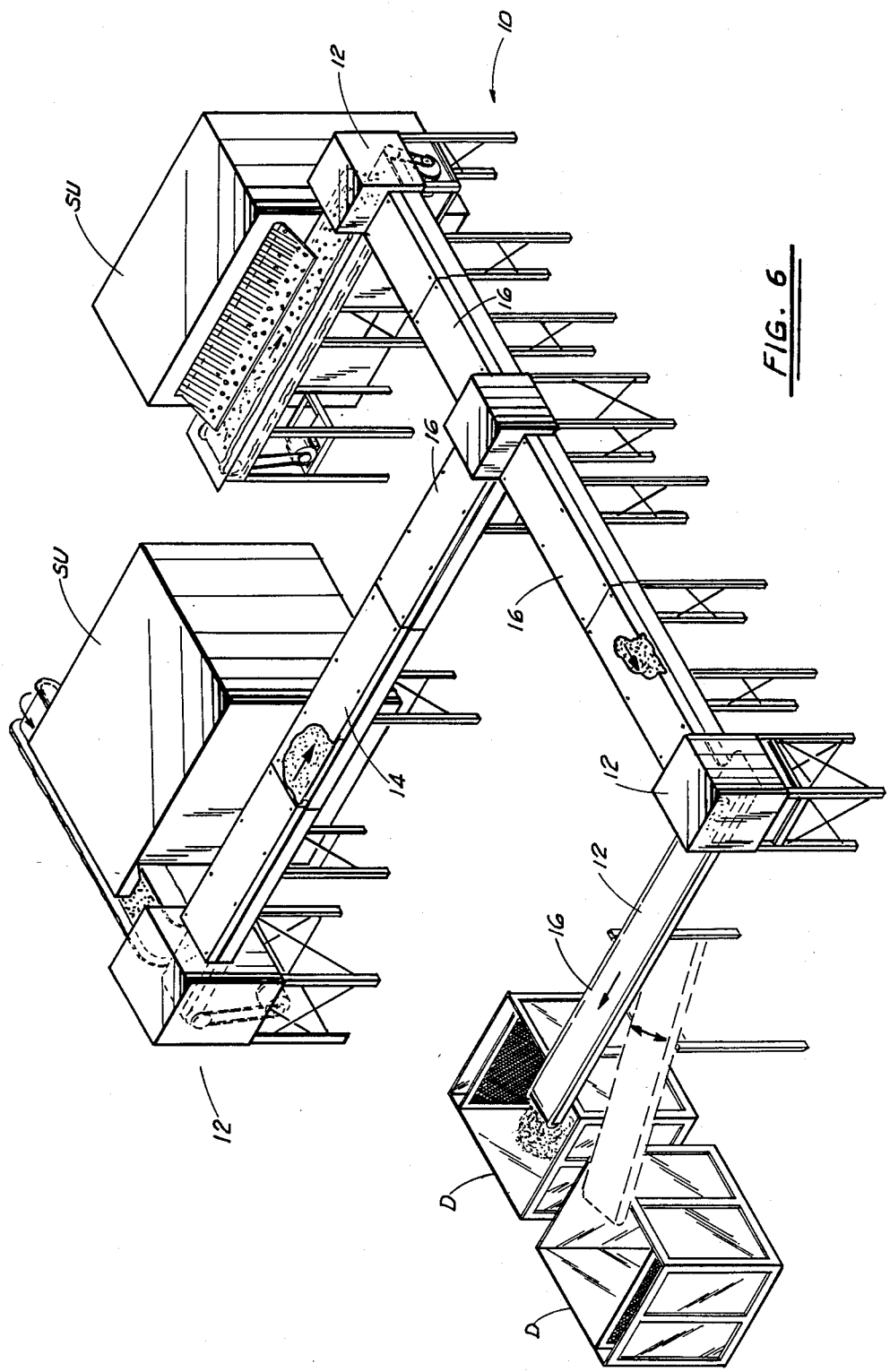
FIG. 6 is a schematic illustration illustrating the method of the present invention used on an oil well drilling rig.

FIGS. 1 and 2 best illustrate the preferred embodiment of the apparatus of the present invention designated generally by the numeral 10. FIGS. 1, 2 and 6 illustrate the method of the present invention. Conveyor system 10 includes preferably three independent structurally self supporting sections 12, 14, 16 including drive section 12, transitional section 14 and a tail or idler section 16. Each section 12, 14, 16 is fabricated of welded structural steel for example. Each section 12, 14, 16 is preferably self-supporting structural unit as is the entire assembly of FIGS. 1 and 2. As will be described more fully hereinafter, the sections 12, 14, 16 bolt together with flanges which abut in a face-to-face arrangement so that the units can be joined together end-to-end by bolting, for example.

Each section 12 includes an outer shell 18 of structural steel, for example. Each outer shell includes side walls 19, 20, rear wall 21. An underside or bottom 24 on section 12, 24 communicates with an inclined portion 23 which communicates with a bottom section 22 having a lower elevational position than the bottom section 24 as best seen in FIG. 2.

A motor and gear reduction mechanism 25 connects with shaft 26 for powering driver roller 30. FIG. 4 shows drive roller 30 removed from drive section 12 to show its construction more particularly. Roller 30 includes a plurality of radially spaced channels 32 which extend laterally across the outer surface of roller 30. Additionally, diagonally spaced and cross-hatched grooves 33 are provided which extend on the surface of roller 30 between adjacent channels 32. Since the present apparatus is used as part of a method for transporting oil well drill cuttings, channels 32 and grooves 33 function to channel away any material such as oil, drilling mud, cuttings, water or the like which would inhibit the frictional contact between drive roller 30 and belt 40. Note that each channel 32 extends laterally to the sides 31 of roller 30. In FIG. 4, channels 32 can be seen extending all the way across the roller 30 so that complete flow of material is provided to remove any material that might reduce the frictional contact between belt 40 and drive roller 30. Wiper W enhances removal of any material or fluid from roller 30. Wiper 30 can be rubber or PVC for example.

A tensioning roller 50 is also shown in the drive section 12 of conveyor system 10. Roller 50 is rotatably positioned on a shaft generally below belt 40 and below the axis 27 of the drive roller 30. Roller 50 contacts belt 40 at position 43 and causes the return portion 40R of belt 40 to rise after leaving drive roller 30 (FIG. 2). The uppermost surface of roller 50 is thus at substantially and equal elevation with the return bed bottom portion 24 of each Section 12, 14, 16 that supports return portion 40R of belt 40 (see FIGS. 2 and 3).

FIG. 3 illustrates a sectional view of the structural Sections 12, 14, 16. In FIG. 3, the bottom 24 return bed can be seen as comprising a flat section of sheet metal such as iron, steel, or the like. An elongated pair of channels 52, 54 extend longitudinally along the bottom side of each Section 12, 14, 16. Spaced at intervals and transversely between channels 52, 54 are transverse supports 56 which can be, for example, channel, angle shapes, or the like.

Flanges 58 are perpendicularly mounted with respect to the belt 40, each flange carrying preferably two or more openings 59. Upon assembly, these flanges 58 abut and the openings 59 align so that bolted connections can be used to flange or bolt adjacent Sections 12, 14, 16 together as shown in FIGS. 1 and 2.

Each Section 12, 14 16 includes a V-shaped conveyor bed comprising a pair of inclined structural surfaces 60, 62 which are joined as shown in FIG. 3 to the side walls below the upper edges of the sidewalls forming a continuous, longitudinally extending bed for supporting the conveyor 40C portion of belt 40. This "V" creates a recess or channel 65 that extends longitudinally the entire length of the apparatus between drive roller 30 and idler 70 affixed to the tail section 16 by means of shaft 72. Belt 40 preferably is of a composite construction having an upper surface 41 of rubber such as PVC (poly Vinyl chloride) and a lower surface of fabric 72. The fabric 72 portions provides a relatively low friction surface which can easily slide upon inclined surfaces 60, 62 and upon bottom 24. The upper rubber surface is preferably impermeable to fluids such as oil, drilling mud or the like.

In FIG. 6, a schematic view illustrates operation of the present method in an oil well drilling unit environment. Solids units SU discharge waste products of oil well drilling that are known in the art such as shale cuttings, drilling mud, waste oil and the like. Such waste products are very oily and have a potentially disastrous effect on the environment if spilled, especially if in water. With the present invention however, the side walls 19, 20 and bottom 22, 23, 24 define a sealed channel which functions to contain any sipplage while also adding structural integrity to each section 12, 14, 15 and further supports the return belt section 40R. A cover c (FIGS. 1 and 2) can be used, flanging to sidewalls 19, 20 with flanges similar to those flanges 58 which bolt sections 12, 14, 16 together.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of disposing of oil well drilling cuttings that comprise a combination of rock drill bit cuttings, drilling mud, and oil comprising the steps of:
    a. providing an elongated, two level structural conveyor including at least two elongated self-supporting, structural fluid containing sections temporarily connectable together to form an enclosure that will contain fluids, one of the sections carrying a motor driven drive roller and the other section containing an idler roller spaced therefrom with an elongated endless conveyor belt being mounted upon and between the two spaced apart rollers;
    b. supporting the upper or conveying portion of the belt with an upper level V-shaped conveyor support bed so that the belt slides upon the V-shaped support bed;
    c. supporting the return portion of the endless belt with a lower level return bed portion of the structural sections so that the belt slides on the return bed;
    d. transporting oil well drill cuttings on the V-shaped support bed with the belt between intake and discharge positions that are spaced apart and respectively adjacent the spaced rollers by frictional drive transmitted to the belt with the drive roller;

e. containing any fluid transmitted by the conveyor belt within the structural conveyor section so that leakage does not occur in the central portion of the conveyor sections generally between the two rollers;

f. discharging the conveyed cuttings from an end portion of the conveyor adjacent one of the spaced apart two rollers; and g. using transverse channels on the drive roller to channel away fluids from the area of contact between the drive roller and belt.

2. The method of claim 1 wherein in step a, there is a third transitional section positioned between the drive and idler sections.

3. The method of claim 1 wherein the belt has a fabric like undersurface.

4. The method of claim 1 wherein in step a, the return and conveyor belt sections are closer together dimensionally than the diameter of the drive roller.

* * * * *